United States Patent [19]

Seagle

[11] Patent Number: 5,764,446
[45] Date of Patent: Jun. 9, 1998

[54] MAGNETIC HEAD HAVING AN AIR BEARING SURFACE WITH SHORT-RESISTANT LEADS

[75] Inventor: David John Seagle, Morgan Hill, Calif.

[73] Assignee: International Business Machines Corporation, Armonk, N.Y.

[21] Appl. No.: 641,561

[22] Filed: May 1, 1996

[51] Int. Cl.$^6$ .................................. G11B 5/30; G11B 5/29
[52] U.S. Cl. .................................... 360/113; 360/121
[58] Field of Search ................................ 360/113, 126, 360/121

[56] References Cited

U.S. PATENT DOCUMENTS

| 4,807,074 | 2/1989 | Kamo | 360/113 |
| 5,140,484 | 8/1992 | Maruyama | 360/113 |
| 5,283,521 | 2/1994 | Ottesen et al. | 324/225 |
| 5,412,518 | 5/1995 | Christner et al. | 360/66 |
| 5,465,186 | 11/1995 | Bajorek et al. | 360/113 |
| 5,653,013 | 8/1997 | Gill | 360/113 |

FOREIGN PATENT DOCUMENTS

| 553434-A2 | 8/1993 | European Pat. Off. | G11B 5/39 |
| 60-18810 | 1/1985 | Japan | G11B 5/39 |

OTHER PUBLICATIONS

Finn Jorgensen, *The Complete Handbook of Magnetic Recording 3rd Edition*, pp. 146–147; 1988 Publication Date Sufficiently Early to Preclude Inclusion of Month of Publication.

C. Denis Mee et al., *Magnetic Recording, vol. 1, Technology*, pp. 270–295; 1987 Publication Date Sufficiently Early to Preclude Inclusion of Month of Publication.

*Primary Examiner*—A. J. Heinz
*Attorney, Agent, or Firm*—Baker Maxham Jester & Meador

[57] ABSTRACT

A magnetic head structure including a magnetoresistive (MR) head and an inductive head for data storage devices such as tape drives. A method of fabricating a magnetic head utilizing semiconductor-type processing techniques is described that produces an inductive head gap having a substantially flat planar structure throughout in length which, in one embodiment, has a length of 150 microns and a height of one micron. The structure includes a first and second shield, and an MR layer formed therebetween that includes an MR sensor adjacent to the air bearing surface (ABS), leads connected on opposite sides of the MR sensor, and isolated segments situated between the leads and extending all the way to the ABS. A trench (i.e. gap) is formed between the leads and the segments. Preferably, the leads and the segments are deposited simultaneously, and the insulating gap is formed subsequently by photoresist and masking techniques. By isolating the segments electrically, the leads are isolated from short circuits appearing across the ABS, thereby reducing noise, enhancing reliability and providing better performance, while at the same time providing a substantially flat structure upon which to form the inductive head and thereby provide a substantially uniform inductive head gap. Embodiments include merged heads and piggyback heads.

9 Claims, 6 Drawing Sheets

MAGNETIC HEAD HAVING AN AIR BEARING SURFACE WITH SHORT-RESISTANT LEADS

BACKGROUND OF THE INVENTION

1. Field of the Invention

The present invention relates to a magnetic head for data storage devices. Particularly, the invention relates to magnetic head assemblies having a magnetoresistive head and an inductive head and an air-bearing surface (ABS) that exposes the magnetoresistive element, the leads connected to the magnetoresistive element, and an inductive gap.

2. Description of the Related Art

A typical configuration for an information storage subsystem of a modern computer installation includes direct access memory for immediate storage and retrieval, and a magnetic tape drive for backup storage of information stored in the direct access memory. The most commonly-used direct access storage device in portable and desktop computer systems is the disk drive. Prudent computer system management requires that the data be periodically copied (backed-up). Further, it may be desirable to preserve data in an archive or library or in a medium that can be manually transported to another computer system. Magnetic tape is widely used for these purposes.

Magnetic tape drive units include a magnetic head assembly and a drive assembly that moves a magnetic tape across the magnetic head to perform recording, playback, and servo operations. In one conventional tape drive the movement of the tape develops an air cushion between the tape and an air bearing surface (ABS) of the head assembly that causes the tape to be spaced slightly apart from the ABS a small distance, this distance being referred to as the "flying height". Most high capacity magnetic recording units, including tape drives, have multiple heads to read and write data in multiple tracks in parallel.

A typical high performance magnetic head assembly has at least one write element and one read element. One important category of such heads includes an inductive head serving only to write data and a magnetoresistive (MR) head serving only to read data, all implemented in a single magnetic head. The inductive head includes an inductive coil situated between a first and a second pole, and the MR head includes an MR element situated between a first and a second shield. At the ABS, the inductive head terminates at a gap defined between the first and second poles, and the MR head terminates at an edge of the MR element. At least two designs of inductive/MR head assemblies are known: the piggyback head and the merged head. In a piggyback head design, the second shield is formed of a physically separate layer from the first pole, while in a merged head design the second shield and the first pole are defined by the same layer. Although the piggyback head design has advantages that include increased performance due to increased isolation between the inductive and the MR heads, the merged head design has become very popular due to its lower production cost and still relatively high performance.

Fabrication of magnetic heads is accomplished by conventional semiconductor-type process methods. In a typical manufacturing process, a large number of magnetic heads are fabricated from a single wafer having one or more rows of magnetic heads formed in a series of steps on the wafer surface. Then, the magnetic heads are individually sliced from the wafer and processed further, such as by lapping and polishing. In some processes, particularly for disk drive uses, single rows are sliced from the wafer to provide a bar that can be further processed into individual head assemblies. Each row bar is then bonded to a fixture or tool where the bar is processed and then further diced, i.e. separated, into individual head assemblies as appropriate.

As discussed above, the inductive head includes a gap defined between the two poles on the ABS. To write data to a track, the inductive head gap is passed adjacent to the track, and the inductive coil is energized with alternating positive and negative current to write correspondingly alternating regions of magnetization to the magnetic media. The region under the gap is then written with the selected transition.

The configuration of the inductive and MR elements in a head assembly can greatly affect performance. For highest performance, an inductive head should have a thin, narrow gap (e.g. 1–2 microns) that is perfectly flat on either side, so that the transitions written through to the tracks of the magnetic medium are as flat as possible. In other words, if the two opposing surfaces in the lengthwise direction are perfectly straight, perfectly flat, and spaced apart exactly the same distance throughout the entire length of the gap, the write head can write undistorted (i.e. flat) transitions. However, in a non-ideal (i.e., somewhat distorted) head the transition will be written with some degree of non-planarity that is directly related to the distorted shape of the gap. In summary, a flat write head writes flat transitions, a distorted write head writes distorted transitions. Because MR heads read flat transitions much better than distorted transitions, a non-flat transition causes difficulties in readback.

Due to the semiconductor-type manufacturing process in which each layer in the magnetic head is formed sequentially, one on top of the other, any bump or other nonuniformity in one layer is passed on to all of the subsequently formed layers. In other words, any deviation in contour of any of the layers will be propagate to each subsequently formed layer in the structure. Because the inductive gap should have a flat, uniform shape for optimum performance during writing, it is advantageous if, each of the layers formed before the first and second poles has a flat, uniform shape, i.e., an even thickness throughout its length. Otherwise, the deviations will propagate to the inductive gap and cause corresponding distortion of the written signal and eventual degradation of the signal. Although distortion can be a problem in DASD (Direct Access Storage Device) systems such as disk drives, distortion due to shape distortions can be a significant problem in magnetic tape systems due to their substantially wider track width. It can be shown that the loss factor during readback (as a function of frequency) can be approximated by the following equation:

$$\text{Loss (during readback)}=1-\tfrac{1}{2}(\pi D\, y_{rms})^2 \qquad \text{Eq. 1}$$

where:

$y_{rms}$ is the root-mean-square (rms) deviation of the track from its average position integrated across the portion of the track under the read head, and D is the linear density, which is defined as the frequency of the data as seen by the write head divided by the velocity of the magnetic medium.

Additionally, for high density implementations that show a large loss, another effect is significant phase distortion.

In the worst case of Eq. 1, for a head that writes a transition with a step nonuniformity, the read head will be displaced such that half of the element is reading transition regions leading the average while the other half is reading transition regions trailing the average. From Eq. 1, it follows, for high density recording, a straight, uniform write gap will provide optimum performance.

Although a flat, uniform gap is desirable, certain considerations relating to designing the MR head (which is formed before the inductive head) cause difficulties in achieving a uniform thickness along the ABS. The MR element has an edge that is centered with the inductive gap and extends along the ABS for a length that is shorter than the inductive gap length by, for example, one-third. Adding to the length of the MR layer along the ABS are the two leads that necessarily extend to the ABS in order to inject current orthogonally across the MR element. If these two leads could be extended beyond the edge of the inductive gap, then the MR material and the leads would together form a layer of substantially uniform width. However, there is a serious problem associated with extending the leads all the way beyond the edges of the inductive gap, which is the problem of shorting the MR leads through one or both shields. In one example, the inductive gap has a length of 150 microns and the MR element has an exposed length of 50 microns. To extend the leads beyond the edges of the inductive gap would require that each lead have at least 50 microns exposed on the ABS, which unfortunately greatly increases the likelihood of short circuiting the leads.

Short circuits can be a significant problem with MR heads. Such shorts occur in the internal portion of the leads as well as on the ABS, and can be minimized by making the leads as narrow as possible. It may be recalled that the conductive layers-including the shields, poles, and leads-are electrically insulated only by a relatively thin (e.g. 0.25 microns) dielectric (alumina) layer. If, for example, both leads cross this distance and become electrically connected to the shield, the result may be impaired performance (a noisy output) or outright failure (total loss of signal). Shorts may be formed during manufacture of a MR tape head, by smearing of the metal from the leads, element and shields across the dielectric layer by, for example, the final lapping process. During operation, the roughness of the tape during normal operation can contribute to such shorts. Even a simple scratch can cause a short.

Another serious problem is a short that appears intermittently. Intermittent shorts may be caused by microscopic shorts inadvertently created during manufacturing, handling, or operation. Such shorts can be hard to detect because they show their presence intermittently, and may appear only as noise during data detection.

In summary, long leads exposed to the ABS greatly increase the probability of shorting, and therefore, it is desirable to minimize the exposure of leads at the ABS. However, if ABS exposure is minimized by forming shorter leads, then the structure will have distortions that are passed on to the gap in the inductive head, and performance would be degraded accordingly. It would be an advantage to provide a magnetic head that reduces susceptibility to shorts and yet minimizes distortions in the inductive head.

SUMMARY OF THE INVENTION

A method of fabricating a magnetic head for a data storage device is described herein. The magnetic head includes a magnetoresistive (MR) head and an inductive head, and the data storage device includes any type of magnetic storage media; however, the head described herein is particularly useful for tape drives.

In the described method, fabrication steps are performed using a semiconductor-type process at the wafer level, utilizing conventional techniques such as sputtering, ion beam deposition, or plating techniques to deposit a layer. In the instance where structures are to be formed in one or more layers, other conventional techniques such as photoresist and masking may be utilized. An approximately planar first shield layer is formed, and then a magneto-resistive sensor is formed over the first shield. A first lead and a second lead are formed over the first shield, coupled on opposite sides of the magnetoresistive sensor. Preferably at the same time as the first and second leads, a first and second isolated segment are formed over the first shield, electrically isolated from the first and second lead, and situated between the first and second leads and the air bearing surface. An approximately planar second shield is formed over the MR sensor, the first and second leads, and the first and second isolated segments. A thin gap layer is formed, and then an inductive coil is formed thereover. A pole layer is formed over the gap layer, and the resulting structure is processed to provide an air bearing surface including an exposed edge of the MR sensor, exposed edges of the first and second leads, exposed edges of the first and second segments, and an inductive head defined by the gap layer as it extends the length of the pole layer.

Thus a magnetic head can be fabricated that provides high performance and increased reliability. By forming a segment on each side of the MR head, isolated from the leads and the MR head, an electrically-isolated segment is created to isolate the leads from short circuits across the ABS. As shorts generally occur at the ABS, such shorts are isolated from the leads and do not affect performance. Furthermore, by isolating a significant source of shorts from the leads and the MR head, the head assembly has improved reliability, and intermittent shorting problems that may be experienced only as noise during readback are reduced, thereby reducing overall noise and providing better performance. The MR head, leads, and isolated segment provide a substantially uniform layer on which to build the inductive head that has a uniform substantially flat rectangular gap that writes data in a substantially undistorted form. The inductive head gap can be made substantially uniform even with high aspect ratios such as 150:1.

The preferred structure is a merged head, in which the second shield performs a dual function, operating also as a first pole. In an alternative embodiment, a piggyback design, a separate pole layer is deposited over the second shield, and the remaining structure is formed thereon.

The resulting structure includes a first and second electromagnetic shield, and a magnetoresistive sensor situated between the first and second shields with an edge exposed to the ABS. Also, a first and a second lead, and a first and a second isolated segment are situated between the first and second shields, each having an edge exposed to the ABS. The first and second leads are electrically coupled to the MR sensor, and the first and second segments are isolated electrically from the first and second leads. An insulative gap is defined between each of the first lead and first segment and the second lead and second segment. An inductive head is affixed to the second shield, including a first pole, a second pole, and an inductive element situated between the first and second poles. An inductive head gap is defined between the first and second poles.

The foregoing, together with other features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

A method is described herein for fabricating a magnetic head for a data storage device. The magnetic head disclosed herein is defined as one having both a magnetoresistive (MR) element (sometimes referred to as a "sensor") for reading data from a magnetic medium, and an inductive element for writing to the magnetic medium. The MR element and the inductive element are formed in a stacked assembly. A planarized air bearing surface (ABS) is formed on the stacked assembly to expose the MR element and the inductive element to the surface of the magnetic medium. The method for forming the magnetic head can be used to fabricate piggyback heads, in which the poles are isolated from the shields that surround the MR heads, and merged heads, in which one of the poles is co-extensive (comprises the same layer) as one of the shields.

The magnetic head formed according to the process described herein can be utilized within conventional tape drive units that are used to back up other storage systems or for general purpose recording. In a typical configuration, a computer installation includes direct access memory unit such as a disk drive for immediate storage and retrieval, and a magnetic tape drive for back-up storage of information stored within the direct access memory.

Figure 1A:
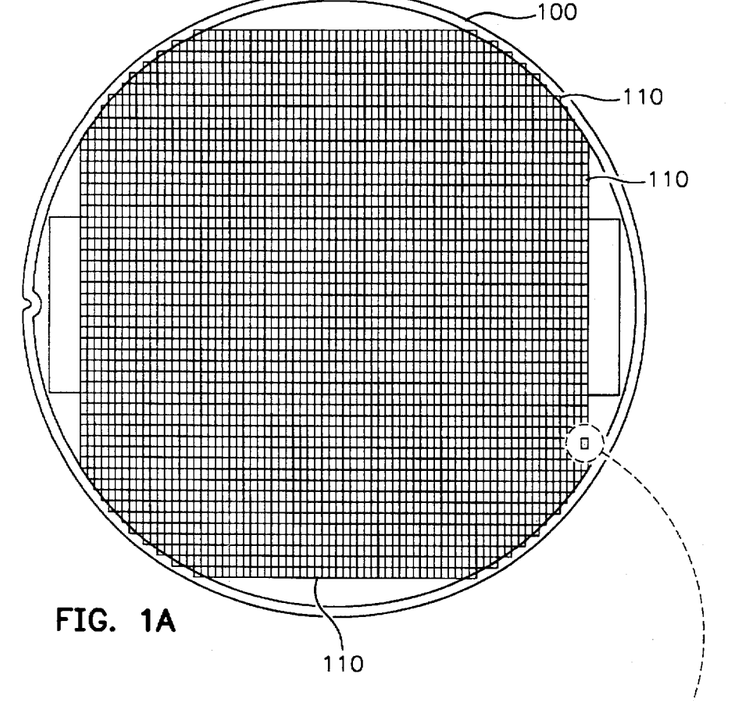
FIG. 1A is a top plan view of a wafer having a plurality of magnetic heads formed thereon.
Figure 1B:
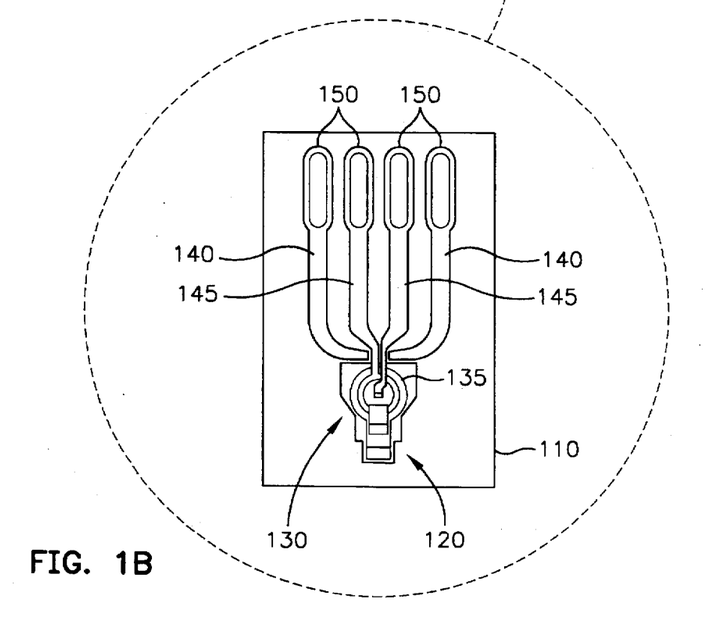
FIG. 1B is an enlarged top plan view of one of the completed magnetic heads shown in FIG. 1A.

Reference is now made to FIGS. 1A and 1B. FIG. 1A is a top view of a wafer with a plurality of magnetic heads formed thereon. FIG. 1B is an enlarged top view of one of the magnetic heads completed on the wafer. Processing begins with a conventional wafer slice 100 comprising, for example alumina/titanium-carbide with a diameter of, for example 4 to 6 inches and a thickness of approximately 2 millimeters. As will be described herein, a plurality of magnetic heads 110 are fabricated on a single wafer utilizing semiconductor-type processing methods, which will be described in greater detail subsequently. FIG. 1B is a magnified view of the top surface of one completed magnetic head 110. The magnetic head includes a magnetoresistive head illustrated generally at 120 and an inductive head illustrated generally at 130, including a coil 135. A first pair of leads 140 connect the MR head shown generally at 120 and a second pair of leads 145 are connected to the inductive head. Each lead includes a pad 150 for connection with a wire (not shown) that leads to external circuitry that supplies and receives appropriate signals for reading and writing.

Figure 2:
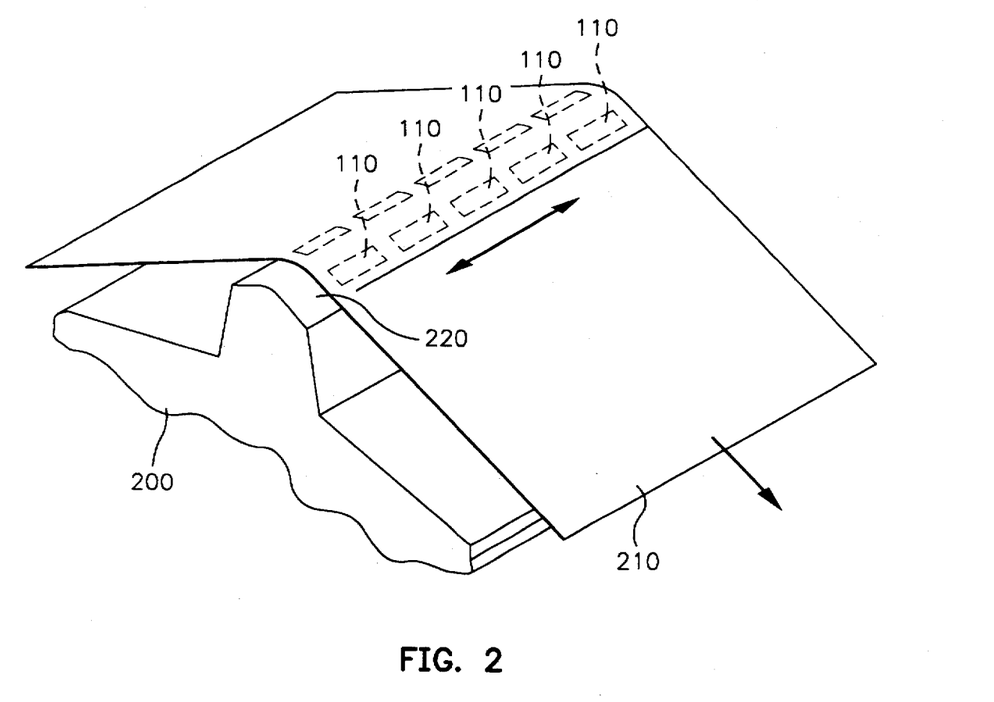
FIG. 2 is a perspective view of a section of a head mount with a strip of magnetic tape being pulled over an air bearing surface (ABS).

Reference is now made to FIG. 2 which is a perspective view of a section of a head mount 200 with a strip of magnetic tape 210 being pulled over the air bearing surface 220. The magnetic tape 210 is held in tension over the surface by conventional tape drive systems. In the illustrated head mount, a plurality of magnetic heads 110 are assembled in a relationship to read and write data with the magnetic tape. Although five heads are shown, in any particular embodiment, one or more heads can be utilized. As is known, each head is positioned to access one track on the magnetic tape, and in the instance when multiple heads are utilized (as illustrated), multiple tracks can be written and read in parallel.

Fabrication of the magnetic head 110 is described with reference to FIG. 3, which is a perspective view of a completed magnetic head viewed from an air bearing surface (ABS) 300. The view in FIG. 3 includes a cross-section taken perpendicular to the ABS 300. As discussed earlier with reference to FIG. 1, the magnetic head is formed on a substrate 100 that includes, for example alumina/titanium-carbide and has a thickness of approximately 2 millimeters. The fabrication steps are performed using a semiconductor-type process at the wafer level, utilizing conventional techniques such as sputtering, ion beam deposition, or plating techniques to deposit a layer. In the instances where structures are formed, conventional techniques such as photoresist and masking may be used. On top of the substrate 100, a thin undercoat 320 is formed comprising an insulative dielectric material such as alumina having a thickness of, for example, 5.0 to 10.0 microns.

A planar first shield 330 is then formed on top of the undercoat 320. The first shield 330 preferably comprises a magnetically soft material such as nickel-iron, and has dimensions, for example, of 2 to 3 microns. A second thin layer of alumina 340 (e.g. 0.2 to 0.3 microns) is formed on top of the first shield 330.

Figure 3:
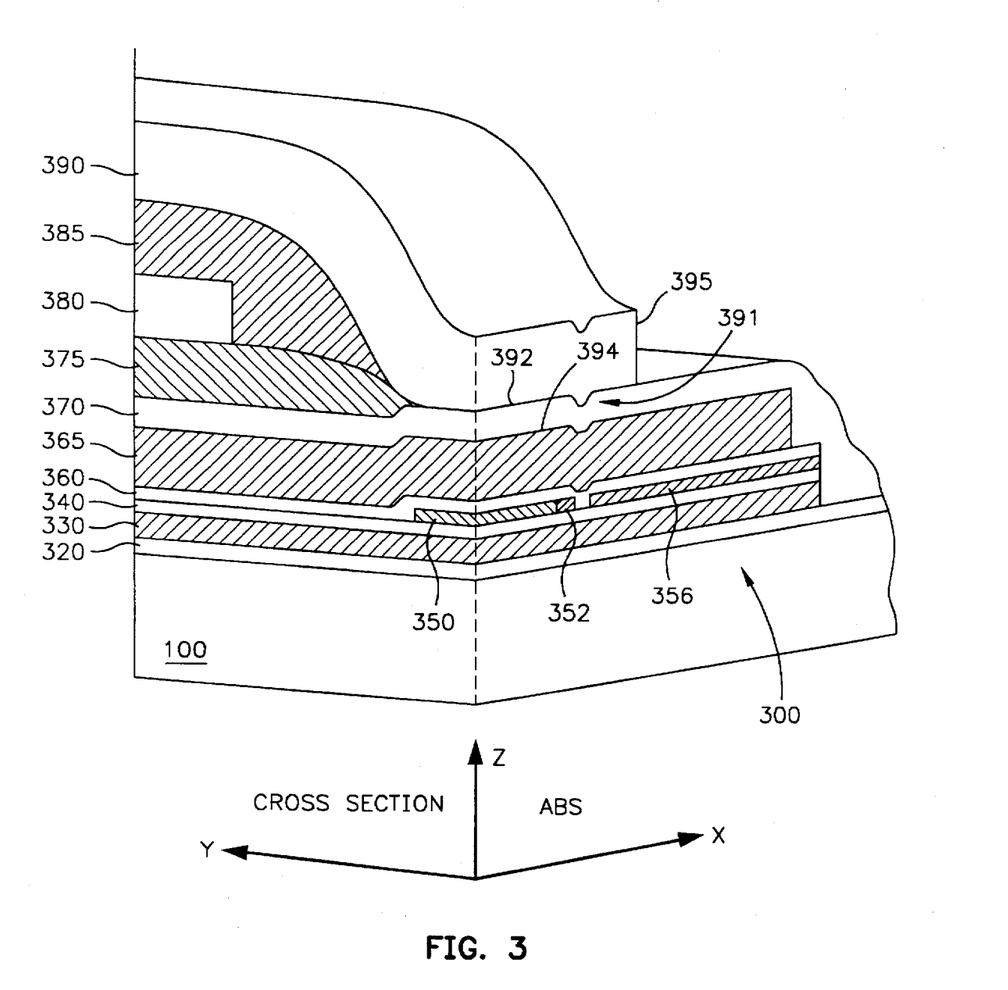
FIG. 3 is a perspective, close-up view of a merged magnetic head viewed from an air bearing surface, and also showing a cross-section taken perpendicular to the ABS.
Figure 4:
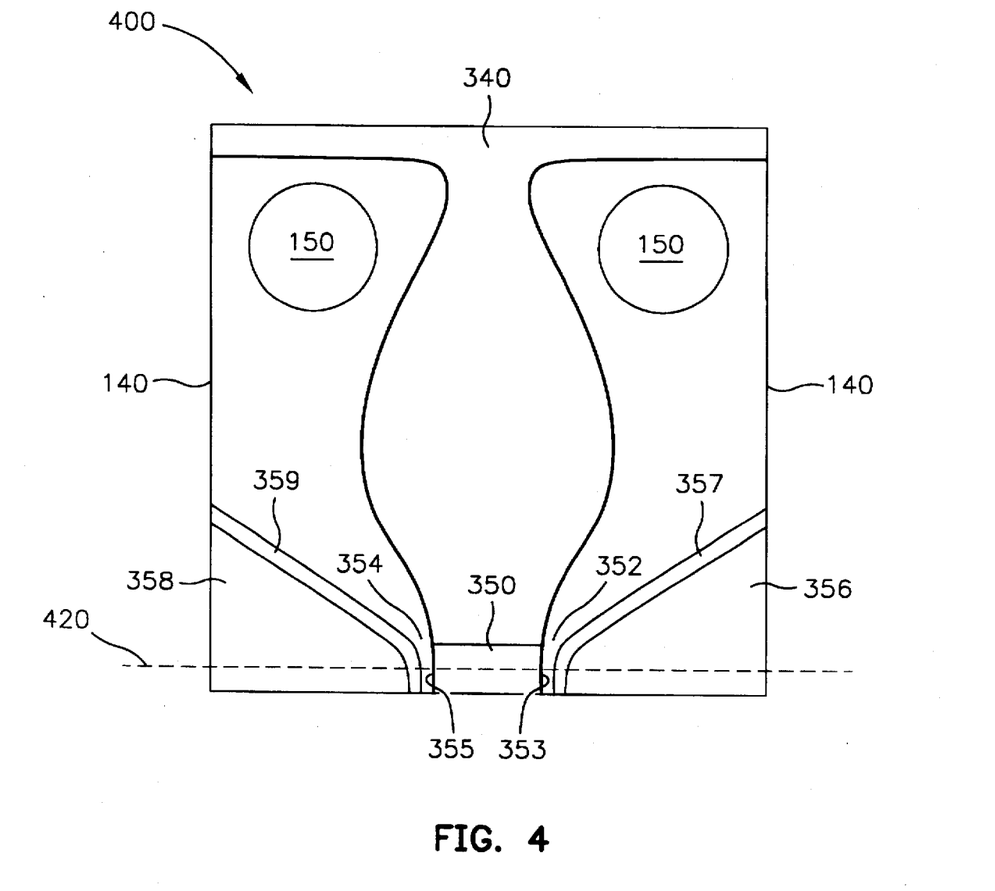
FIG. 4 is a top plan view of a completed magnetoresistive layer including an MR sensor, leads, and isolated segments.

Reference is now made to FIG. 4 in conjunction with FIG. 3. FIG. 4 is a top plan view of a completed MR layer 400 that includes an MR sensor 350, leads 352 and 354, and segments 356 and 358 formed over the second alumina layer 340. A magnetoresistive (MR) sensor 350 is formed over the second alumina layer 340 in an approximately rectangular shape having one side adjacent to the ABS 300. In one embodiment the MR sensor 350 includes three layers (not shown). The first layer includes an MR material that comprises, for example nickel-iron, the second layer comprises a separator such an tantalum, and the third layer comprises a soft adjacent layer, for example nickel-iron-chrome (NiFeCr). The total thickness of the sensor may be approximately 1000 Å, of which about 500 Å comprise MR material.

The leads 140 are formed in an electrically-coupled relationship with opposite sides of the magnetoresistive material. Particularly, a first lead 352 is coupled along a first side 353 of the MR sensor and a second lead 354 is coupled to a second side 355. In one embodiment the leads comprise two layers, including a hard magnet layer comprising cobalt and chrome, for example, and a conductive layer that includes gold or tantalum, for example. In operation, a bias current will be applied through the leads to the MR sensor.

Each of the two leads 352 and 354 extend along the entire length of the sides 353 and 355 of the MR sensor, in order to inject the current parallel with respect to the ABS 300. For optimum performance, parallel injection of the bias current is desirable and therefore the leads extend all the way to the edge of the ABS. As the leads extend away from the ABS 300 and continue through the head to the pads, the leads expand in width in order to decrease impedance. Preferably, the leads have a thickness that approximately matches the thickness of the MR sensor (e.g. 1,000 Å) and a width of at least five microns extending from both edges of the MR sensor.

A first isolated segment 356 and a second isolated segment 358 are formed over the second dielectric layer 340, extending between the leads and the ABS. The segments 356 and 358 are isolated from the first and second leads by trenches formed therein. Particularly, the first isolated segment is separated from the first lead 354 by first trench 357 and a second isolated segment is separated from the second lead by a second trench 359. Proximate to the ABS, the trenches should have a small length (as measured at the ABS) less than 10 microns. A smaller length is advantageous due to the reduced size of the nonuniformity produced by the gap.

Preferably, the isolated segments 356 and 358 are formed at the same time the leads are formed. In one preferred process, photoresist and masking techniques provide the trenches (i.e. gaps) that isolate the segments from the leads, together with other necessary features. Then the leads and the segments are deposited simultaneously using a conventional process such as sputtering or ion beam deposition. Therefore, because the segments and leads are formed by a single deposition, they comprise the exact same layers, and advantageously both the leads and the segments have the same thickness. As a further advantage, because no additional steps are required, no additional costs are incurred to form the segments. In another embodiment, the segments and leads could be formed in separate processes, however additional steps would be required and additional costs would be incurred.

After the structure including the MR sensor 350 and the leads and the isolated segments are formed, a third dielectric layer 360 of alumina is formed over the completed MR, leads, and isolated segments. A second shield 365 is formed over the alumina layer 360, preferably comprising a magnetically soft (i.e. easily magnetized) material such as nickel-iron, as in the first shield. A fourth alumina layer 370 is then formed over the second shield 365. It may be noticed that the fourth alumina layer 370 extends over the edges of the shield and other components surrounding the MR head. In a design shown herein, which is a merged head design, the second shield 365 has a dual function; specifically, the second shield 365 also functions as a first pole for the inductive head to be formed. In other embodiments, such as the piggyback embodiment illustrated in FIGS. 5 and 6, the first pole will be a separate structure that is formed as a thin planar layer on top of the fourth alumina layer 370. Then on top of that first pole, another alumina layer would be deposited.

On top of the fourth alumina layer 370, a layer 375 of insulative material, such as a hard-baked photoresist is deposited, and a coil structure, one of whose turns is illustrated at 380, is then deposited over the top of the insulative structure 375. Preferably the coil structure is formed of copper. Subsequently, a second insulative layer 385 is deposited over the inductive coil. Finally, a second pole 390 is formed over the inductive coil and insulative layers. (The second shield 365 operates as a first pole in this embodiment.) Subsequent to completion of the wafer level operations, operations such as lapping still remain necessary in order to further process the magnetic head to provide the ABS. Such processes do not form a part of the present invention, and may be performed by any conventional process. During lapping, the magnetic head is processed to provide an air bearing surface that includes an exposed edge of the magneto resistive element, exposed edges of the first and second leads, and exposed edges of the first and second segments, and also the flat, planar gap that comprises the inductive head. This final step is necessary to provide a completed head assembly. In the magnetic head illustrated in FIG. 3, the ABS 300 has been lapped and polished to provide the final ABS. In FIG. 4, a dotted line 420 shows the lapping line, which is the line at which the ABS will be formed. On the ABS side, the inductive head gap is defined in an area 391 between the edge 395 of the second pole 390 and the opposite edge (not shown). The length of the inductive head gap, which is equivalent to the length of the second pole 390, determines the track width written on a magnetic media. The shape of the inductive head gap determines the curvature of the transitions that are written within the track width. In one embodiment, the inductive head has a height of approximately one to two microns and a width of 150 microns thereby writing a track width of about 150 microns. Preferably, the opposing surfaces on the gap (those defined by the ABS facing surface 392 of the second pole and the opposing surface 394 of the first pole) have a straight parallel structure, and are separated by the fixed distance throughout their entire length in order to minimize the curvature of the written transitions.

The total length of the inductive head gap 391 should be no longer than the MR element, the leads, and the segments exposed to the ABS. The length of the MR sensor should be less than the length of the inductive head, and preferably have a ratio of, for example 3:1. Some high performance embodiments may have lower ratios, for example, 2:1. In the embodiment described herein, with a 3:1 ratio and an inductive head length of 150 microns, the MR sensor has a length of 50 microns. In this embodiment, the exposed portion of the leads may be approximately 5 microns, the gap between the leads and the segments is approximately 5 microns and the length of the isolated segments is approximately 50 microns.

Figure 5:
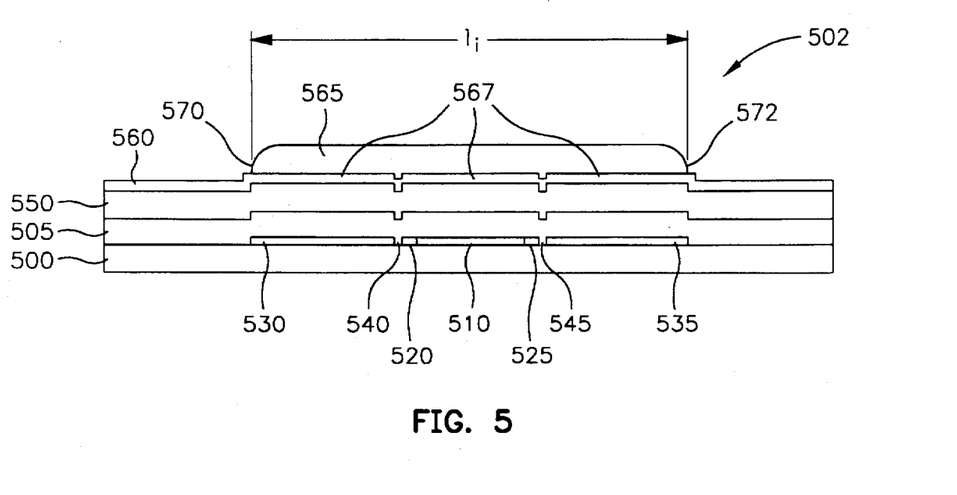
FIG. 5 is a side plan view, from the ABS side, of a piggyback magnetic head structure.
Figure 6:
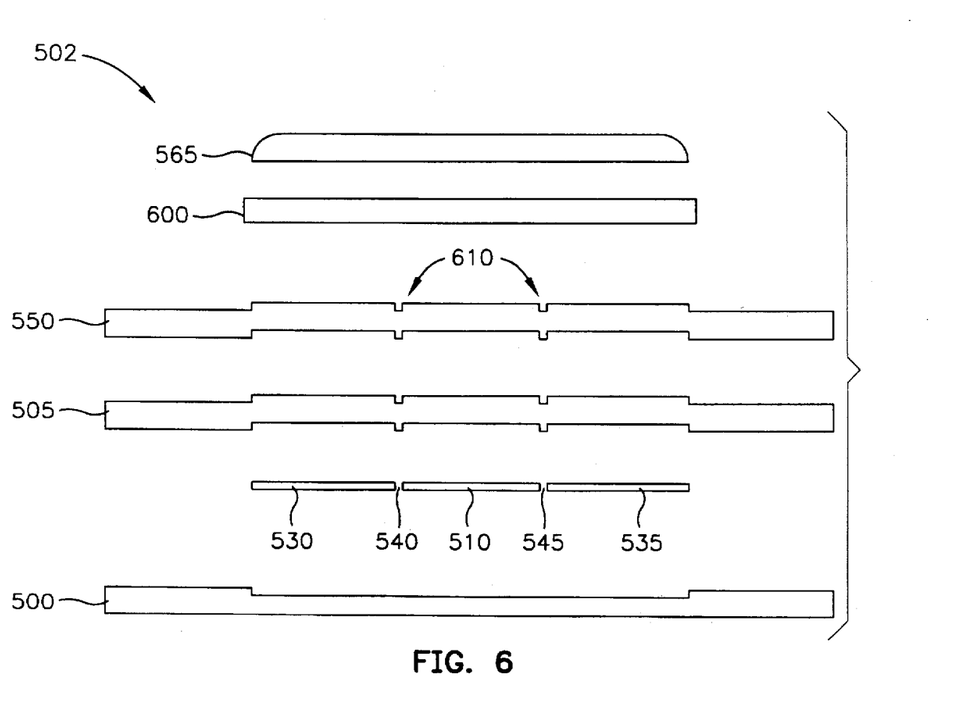
FIG. 6 is an exploded view of the side plan view of FIG. 5, showing the layers separated.

Reference is now made to FIGS. 5 and 6. FIG. 5 is a side plan view from the ABS side of a piggy-back magnetic head structure 502 constructed according to the present invention. FIGS. 5 and 6 are simplified over FIG. 3, in that only pertinent structures are shown. The omitted structures, such as the substrate 100 and dielectric layers are apparent to one skilled in the art. The MR head includes a first electromagnetic shield 500 deposited as discussed previously with reference to FIG. 3 and second electro-magneto shield 505. A MR sensor 510 is situated between the first and second electromagnetic shield, with an edge exposed to the ABS. Leads are connected on either side of the MR sensor, including a first lead 520 and second lead 525. Each of the first and second leads has an edge exposed to the ABS. A pair of segments are provided on the same level, including a first segment 530 and a second segment 535. The structure defined by the MR sensor, the leads, and the segments, which is sometimes terms the "MR layer" herein, may be identical with that illustrated in FIG. 4. Furthermore, as appropriate, alumina layers are situated between the conductive layers in order to isolate them.

A first trench 540 is provided between the first lead 520 and the first isolated segment 530, and a second trench 545 is situated between the second lead 525 and the second isolated segment 535. The trenches 540 and 545 operate to electrically isolate the first and second segments from the first and second leads. Of course, the MR sensor, the leads, and the segments are separated from the surrounding shields by layers of alumina.

A first pole 550 is formed over the second shield 505, and a layer of alumina 560 is deposited thereon having a thickness in the range of one to two microns, for example. The second pole 565 is formed over the gap layer and thus, the inductive head is defined by the portion of the gap layer between the first and second poles, illustrated at 567. Particularly, the length of the inductive head is defined as length $l_i$ defined between a first side 570 of the second pole 565 and a second side 572, opposite thereto.

FIG. 6 is an exploded view of the structure in FIG. 5, in which the alumina layer 560 is omitted for convenience of illustration. In this exploded view, an inductive coil 600 is situated between the second pole 565 and the first pole 550.

From FIG. 6 it can also be seen that the trenches 540 and 545 between the leads and the segments unfortunately cause irregularities be formed in each of the layers formed subsequently thereto. Therefore, along the inductive head gap, two small irregularities, illustrated at 610 are formed. The size of these non-uniformities can be reduced by reducing the size of the trench. For example, if the trench were reduced from 5.0 microns down to one micron, then the nonuniformity 610 would be even smaller.

Thus, a structure is provided that provides high performance and low susceptibility to shorts across the MR head. The design has been tested in a smear-resistant design of QIC500 heads. For QIC3020 MFM operation with a high frequency (HF) of 45 kilo-flux changes per inch (KFCI), the maximum resolution loss with the segments is 1%, an improvement by a factor of three over the loss without the segments, which is 3%.

It is anticipated that tape drive designers will push the linear density for future products at least to 90 KFCI due in part to improvements in channel and particulate media. For 90 KFCI, segmented leads will give about 4% uncorrectable resolution loss vs. 12% for no segments. When thin film evaporated tape is introduced, linear densities up to 150 KFCI may be possible. At 150 KFCI, the corresponding segments and non-segmented resolution losses are 11% and 33%, respectively. The percentage loss of 33% is very significant, and at this level, phase distortion will become significant.

The magnetic head described herein can be utilized within a tape drive or a disk drive. The magnetic head is particularly useful for tape drive use due to the relatively wider tracks on magnetic tape. Tape drives are widely used to back up the internal and direct access storage of a computer system or for general purpose recording of information signals. As is known, such a tape drive can be used to record and back up data from internal and direct access storage facilities so that such data can be used in the event of a malfunction of those facilities or a loss of data in the computer system. Following is a description of a tape drive.

Figure 7:
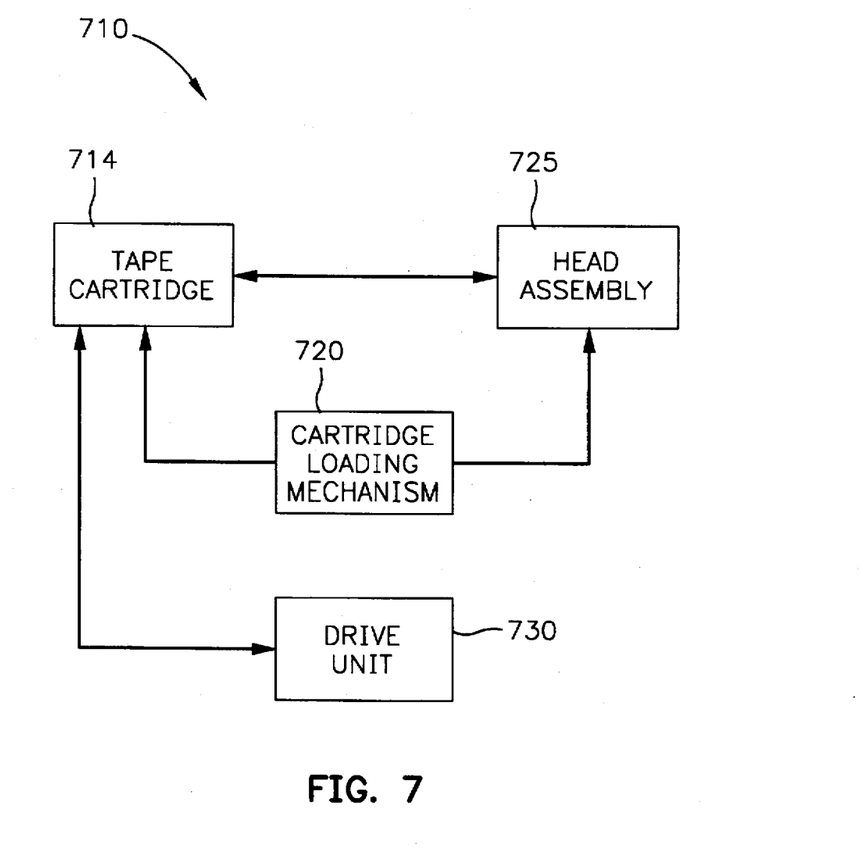
FIG. 7 is a perspective view of an exemplary tape drive.

FIG. 7 is a block diagram of an exemplary tape drive 710 that receives a cartridge 714 that includes magnetic tape in, for example a double-reel configuration. The tape drive 710 includes a conventional cartridge loading mechanism 720 that receives the cartridge 714, exposes the tape, and positions the tape proximate to a head assembly 725 that includes a mount such as shown at 200 (FIG. 2) and one or more magnetic heads as described herein, for record and playback. The magnetic head may include, for example the merged head described with reference to FIG. 3 or the piggyback head described with reference to FIG. 5. The tape is driven longitudinally over the ABS by a drive unit 730 that applies a rotary force to a conventional tape capstan roller.

As the tape advances over the ABS on the head assembly 725, data is recorded ("written") on or read ("played back") from the tape. The head assembly 725, the cartridge loading mechanism 720, and the drive unit 730 may be affixed to a frame by any suitable means.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

What is claimed is:

1. A magnetic head having a planarized air bearing surface (ABS) comprising:

a first electromagnetic shield and a second electromagnetic shield;

a magnetoresistive (MR) sensor situated between the first and second electromagnetic shields, said MR sensor having an edge exposed to the ABS;

a first and a second lead situated between the first and second electromagnetic shields, said first and second leads electrically coupled to the MR sensor, each having an edge exposed to the ABS;

a first and a second isolated segment situated between the first and second electromagnetic shields, said first and second segments respectively positioned between the first and second leads and said ABS, each having an edge exposed to the ABS;

a first insulative gap defined between the first lead and the first segment and a second insulative gap defined between the second lead and the second segment, said insulative gap electrically isolating said first and second segments from said first and second leads; and an inductive head affixed to said second electromagnetic shield, including a first pole, a second pole, and an inductive element situated between said first and second poles, said inductive head defining an inductive head gap between the first and second poles.

2. The magnetic head of claim 1 wherein said second electromagnetic shield and said first pole comprise a single, common layer so that a merged magnetic head is formed.

3. The magnetic head of claim 2 wherein said common layer comprises nickel-iron.

4. The magnetic head of claim 1 wherein said second electromagnetic shield comprises a first layer and said first pole comprises a second layer different from said first layer, so that a piggyback head is defined.

5. The magnetic head of claim 4 wherein said first and second layers comprise nickel-iron.

6. A tape drive unit for reading and writing data on a magnetic tape comprising:

a head mount including a magnetic head having an air bearing surface (ABS) affixed thereon, said magnetic head comprising a first electromagnetic shield and a second electromagnetic shield, a magnetoresistive (MR) sensor situated between the first and second electromagnetic shields, said MR sensor having an edge exposed to the ABS, a first and a second lead situated between the first and second electromagnetic shields, said first and second leads electrically coupled to the MR sensor, each having an edge exposed to the ABS, a first and a second isolated segment situated between the first and second electromagnetic shields, said first and second segments respectively positioned between the first and second leads and said ABS, each having an edge exposed to the ABS, a first insulative gap defined between the first lead and the first segment and a second insulative gap defined between the second lead and the second segment, said insulative gap electrically isolating said first and second segments from said first and second leads, and an inductive head affixed to said second electromagnetic shield, including a first pole, a second pole, and an inductive element situated between said first and second poles, said inductive head defining an inductive head gap between the first and second poles; means for positioning the head mount adjacent to a portion of the magnetic tape; and means for driving the tape over the head mount.

7. The tape drive of claim 6 wherein the magnetic tape defines a plurality of tracks and said head mount includes plurality of magnetic heads positioned thereon to respectively read and write said plurality of tracks.

8. The tape drive of claim 6 wherein said second electromagnetic shield and said first pole comprise a single, common layer so that a merged magnetic head is formed.

9. The tape drive of claim 6 wherein said second electromagnetic shield comprises a first layer and said first pole comprises a second layer different from said first layer, so that a piggyback head is defined.

* * * * *